UNITED STATES PATENT OFFICE.

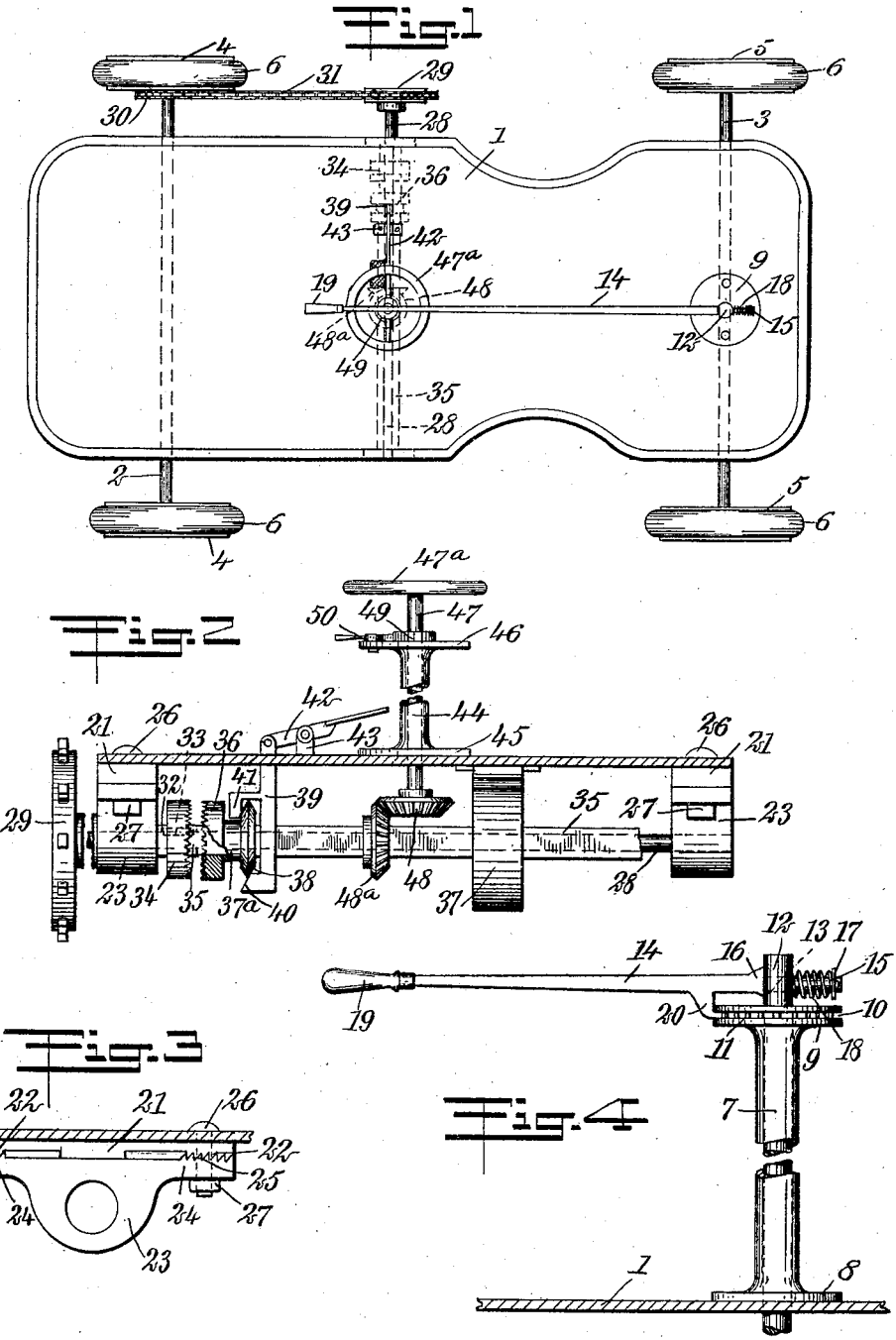

JAMES RITCHIE, OF NEW YORK, N. Y.

MOTOR-VEHICLE.

No. 880,403.  Specification of Letters Patent.  Patented Feb. 25, 1908.

Application filed May 16, 1907. Serial No. 373,905.

*To all whom it may concern:*

Be it known that I, JAMES RITCHIE, a citizen of the United States, and a resident of the city of New York, borough of Brooklyn, in the county of Kings and State of New York, have invented a new and Improved Motor-Vehicle, of which the following is a full, clear, and exact description.

This invention relates to motor vehicles and more particularly to that class of vehicles propelled by means of coiled springs.

The object of the invention is to provide a device of this class in which the driving shaft carries a hollow shaft free to rotate thereupon and actuated by a coiled spring, and a clutch for operatively connecting the driving shaft and the hollow shaft, the hollow shaft being adapted to be operated to wind the spring when the latter has run down.

The invention consists in the construction and combination of parts to be more fully described hereinafter and fully set forth in the claims.

Reference is to be had to the accompanying drawings forming a part of this specification, in which similar characters of reference indicate corresponding parts in all the views, and in which Figure 1 is a plan view of the vehicle; Fig. 2 is a vertical cross-section showing the motor mechanism with parts broken away; Fig. 3 is a side elevation of a bearing for the driving shaft; and Fig. 4 is an elevation of the steering mechanism, showing parts broken away.

Referring more particularly to the drawings, 1 represents the body of the motor vehicle, having a rear or driving axle 2 and a front or steering axle 3. The axles are supported upon the usual vehicle wheels 4 and 5, provided preferably with pneumatic tires 6. The steering axle is rotatably secured to the vehicle frame in the usual manner and can swing in a horizontal plane. Mounted upon the vehicle body above the steering axle is a hollow steering post 7 having the lower end laterally disposed into a flange 8 resting upon the floor of the vehicle and having the upper end similarly disposed into an annular flange 9. The annular flange 9 has a central annular groove 10 having the bottom provided with notches or recesses 11. A steering rod 12 is rotatably arranged in the hollow steering post 7 and extends therethrongh, being operatively connected at the lower end with the steering axle. The upper end extends beyond the steering post and is provided with a transverse bore 13. A steering lever 14 has an end 15 slidably arranged in the bore 13 and presents a shoulder 16 preventing the movement of the steering lever through the bore 13 beyond a certain point. The end 15 extends beyond the rod 12 and has a cap 17. A helical spring 18 is arranged upon the end 15 between the steering rod 12 and the cap 17 and normally holds the shoulder 16 in engagement with the rod 12. The opposite end of the steering lever is provided with the usual handle 19. The steering lever has a lateral finger 20 engaging the groove 10 of the flange 9 and adapted to seat in a notch 11 thereof to lock the steering lever and the steering axle in position. By pulling outwardly upon the steering lever 14 the finger 20 is disengaged against the tension of the spring from the locking notch and the steering lever can be operated to steer the vehicle.

At the under side of the vehicle body at opposite sides thereof are arranged bearing plates 21 having a plurality of corrugations or teeth 22 at the ends thereof. A bearing 23 having similar teeth 25 at laterally disposed extremities 24 is arranged upon each bearing plate 21. The bearing plates and the bearings are secured in position upon the vehicle body by means of bolts 26 located in suitable openings therethrough and secured in position by nuts 27. It will be noted that the teeth of the bearing plates and the bearings engage to prevent the relative movement of the same. Furthermore, the bearings and the bearing plates can be adjusted with respect to one another by means of these teeth.

A driving shaft 28 is revolubly arranged in the bearing 23 and extends therebeyond at one end carrying a driving sprocket 29. A second sprocket 30 is carried by the driving axle. The sprockets are operatively connected by a driving chain 31. An outer shaft section 32 is mounted upon the driving shaft 28 and is rigidly secured in position thereupon by means of a key 33 or in any other suitable manner. The section 32 carries a rigid clutch section 34. A hollow shaft 35, preferably of rectangular cross section, is arranged upon the shaft 28 and carries a slidable clutch section 36 movable on the shaft 35 and adapted to be forced into engagement with the clutch section 34, operatively to connect the hollow shaft 35 and the driving shaft 28. A coiled spring 37 having one end secured to the vehicle body or frame and the other to the hollow shaft 35 serves to drive the latter. The clutch section 36 has an extension 37ª presenting an annular flange 38 having opposite beveled edges. I provide a bracket 39 slidable transversely of the shaft and having an extension 40 having a cam shaped or beveled edge for engaging one of the beveled edges of the annular member, and a second extension 41 having a cam shaped or beveled edge for engaging the opposite beveled edge of the flange 38. A pivoted pedal lever 42 carried by a bracket 43 of the vehicle body serves for moving the bracket 39 transversely of the shaft 35. When the bracket 39 is moved upwardly by depressing the pedal lever 42, the extension 40 engages the beveled edge of the flange 38 and forces the clutch section 36 longitudinally of the shaft 35 into engagement with the clutch section 34. When the bracket 39 is moved downwardly the extension 41 engages the opposite bevel edge of the flange 38 and moves the clutch section 36 longitudinally of the shaft 35 in the opposite direction, to disengage the same from the clutch section 34.

A hollow post 44 having an annular flange 45 at the lower extremity is carried by the vehicle body, the flange 45 resting upon the floor of the same and secured in position thereupon. The post 44 has a similar flange 46 at the upper end. A vertical shaft 47 is revolubly arranged in the hollow post and has the ends extending therebeyond, the lower extremity carrying a rigid bevel gear 48 in mesh with a bevel gear 48ª rigidly mounted upon the hollow shaft 35. At the opposite end the shaft 47 has a hand-wheel 47ª by means of which it can be manually rotated. A ratchet 49 rigid with the shaft is arranged adjacent to the flange 46 and engages a pawl 50 pivotally mounted upon the flange 46. By means of the hand-wheel 47ª through the bevel gearing the shaft 35 can be operated to wind the spring. The pawl 50 serves to lock the shaft against rotation in one direction to prevent the rotation of the shaft 47 when the motor is not in operation. By means of the adjustable bearings 23 the tension of the driving chain 31 can be regulated if necessary.

Having thus described my invention, I claim as new and desire to secure by Letters Patent:—

1. In a motor vehicle, a driving shaft provided with a clutch section, a hollow shaft thereon a clutch section slidable on the hollow shaft for coöperation with the other clutch section, and means for moving said clutch section, comprising an annular flange in connection therewith and having oppositely beveled edges, a bracket slidable transversely of the shaft, and provided on each side of said shaft with an extension, said extensions having beveled edges and engaging the opposite beveled edges of the flange, and means for moving the bracket.

2. In a motor vehicle, a driving shaft provided with a clutch section, a hollow shaft thereon a clutch section slidable on the hollow shaft for coöperation with the other clutch section, and means for moving said clutch section, comprising an annular flange in connection therewith and having oppositely beveled edges, a bracket slidable transversely of the shaft, and provided on each side of said shaft with an extension, said extension having beveled edges and engaging the opposite beveled edges of the flange.

3. In a motor vehicle, a driving shaft provided with a clutch section, a hollow shaft thereon a clutch section slidable on the hollow shaft for coöperation with the other clutch section, and means for moving said clutch section, comprising an annular flange in connection therewith and having oppositely beveled edges, and means engaging said beveled edges for moving the clutch section whereby to engage and disengage the clutch.

In testimony whereof I have signed my name to this specification in the presence of two subscribing witnesses.

JAMES RITCHIE.

Witnesses:
WILLIAM BRERETON,
ROBERT M. KERWICK.